(12) United States Patent
Krenik et al.

(10) Patent No.: US 7,457,625 B2
(45) Date of Patent: Nov. 25, 2008

(54) WIRELESSLY-LINKED, DISTRIBUTED RESOURCE CONTROL TO SUPPORT WIRELESS COMMUNICATION IN NON-EXCLUSIVE SPECTRUM

(75) Inventors: William R. Krenik, Garland, TX (US); Carl M. Panasik, Garland, TX (US)

(73) Assignee: Texas Instruments Incorporated, Dallas, TX (US)

(*) Notice: Subject to any disclaimer, the term of this patent is extended or adjusted under 35 U.S.C. 154(b) by 380 days.

(21) Appl. No.: 10/679,818

(22) Filed: Oct. 6, 2003

(65) Prior Publication Data

US 2004/0077356 A1    Apr. 22, 2004

Related U.S. Application Data

(60) Provisional application No. 60/431,561, filed on Dec. 6, 2002, provisional application No. 60/420,168, filed on Oct. 22, 2002.

(51) Int. Cl.
*H04Q 7/20* (2006.01)

(52) U.S. Cl. .............. 455/450; 455/451; 455/452.1; 455/452.2; 455/552.1; 455/509; 370/329; 370/431

(58) Field of Classification Search .......... 455/450, 455/451, 452.1, 452.2, 453, 464, 509, 454, 455/455, 515, 550.1, 552.1, 553.1; 370/329, 370/431
See application file for complete search history.

(56) References Cited

U.S. PATENT DOCUMENTS

| | | | |
|---|---|---|---|
| 6,104,712 A * | 8/2000 | Robert et al. ............... 370/389 |
| 6,125,278 A * | 9/2000 | Wieczorek et al. .......... 455/437 |
| 6,208,865 B1 * | 3/2001 | Veerasamy .................. 455/450 |
| 6,693,892 B1 * | 2/2004 | Rinne et al. ................. 370/348 |
| 6,716,101 B1 * | 4/2004 | Meadows et al. ......... 455/456.1 |
| 6,799,044 B1 * | 9/2004 | Wesby et al. ............. 455/452.1 |
| 6,868,277 B1 * | 3/2005 | Cerwall et al. .............. 455/509 |
| 6,907,005 B1 * | 6/2005 | Dahlman et al. ............ 370/236 |
| 6,950,417 B2 * | 9/2005 | Soliman ...................... 370/335 |
| 7,127,255 B2 * | 10/2006 | Hsu et al. ................. 455/452.2 |
| 7,328,025 B2 * | 2/2008 | Jechoux ................... 455/452.1 |
| 2002/0082021 A1 * | 6/2002 | Chen et al. .................. 455/450 |
| 2002/0119782 A1 * | 8/2002 | Voyer .......................... 455/450 |
| 2003/0035388 A1 * | 2/2003 | Schmidt ...................... 370/329 |
| 2003/0078037 A1 * | 4/2003 | Auckland et al. ............ 455/422 |
| 2003/0171124 A1 * | 9/2003 | Kataoka ...................... 455/453 |
| 2004/0127226 A1 * | 7/2004 | Dugad et al. ................ 455/450 |
| 2004/0157617 A1 * | 8/2004 | Gorsuch et al. ........... 455/452.2 |

OTHER PUBLICATIONS

"Wireless Mobile Communication Stations for Operation in Non-Exclusive Spectrum", U.S. Appl. No. 10/679,762, filed Oct. 6, 2003.

(Continued)

*Primary Examiner*—Charles N Appiah
*Assistant Examiner*—Olumide T Ajibade Akonai
(74) *Attorney, Agent, or Firm*—Ronald O. Neerings; Wade James Brady, III; Frederick J. Telecky, Jr.

(57) ABSTRACT

Wirelessly-linked, distributed resource control (RCS1-RCSn, RCSB, RCC, ARM) supports a wireless communication system (50) for operation in non-exclusive spectrum (24-29). An available resource map (ARM) contains resource availability information gathered by mobile stations (MS1-MSn), and a wired communication channel supports sharing of resource control information among fixed-site stations (BS).

31 Claims, 4 Drawing Sheets

OTHER PUBLICATIONS

"Information Storage to Support Wireless Communication in Non-Exclusive Spectrum", U.S. Appl. No. 10/679,866, filed Oct. 6, 2003.

"Wired Control Channel for Supporting Wireless Communication in Non-Exclusive Spectrum", U.S. Appl. No. 10/679,817, filed Oct. 6, 2003.

* cited by examiner

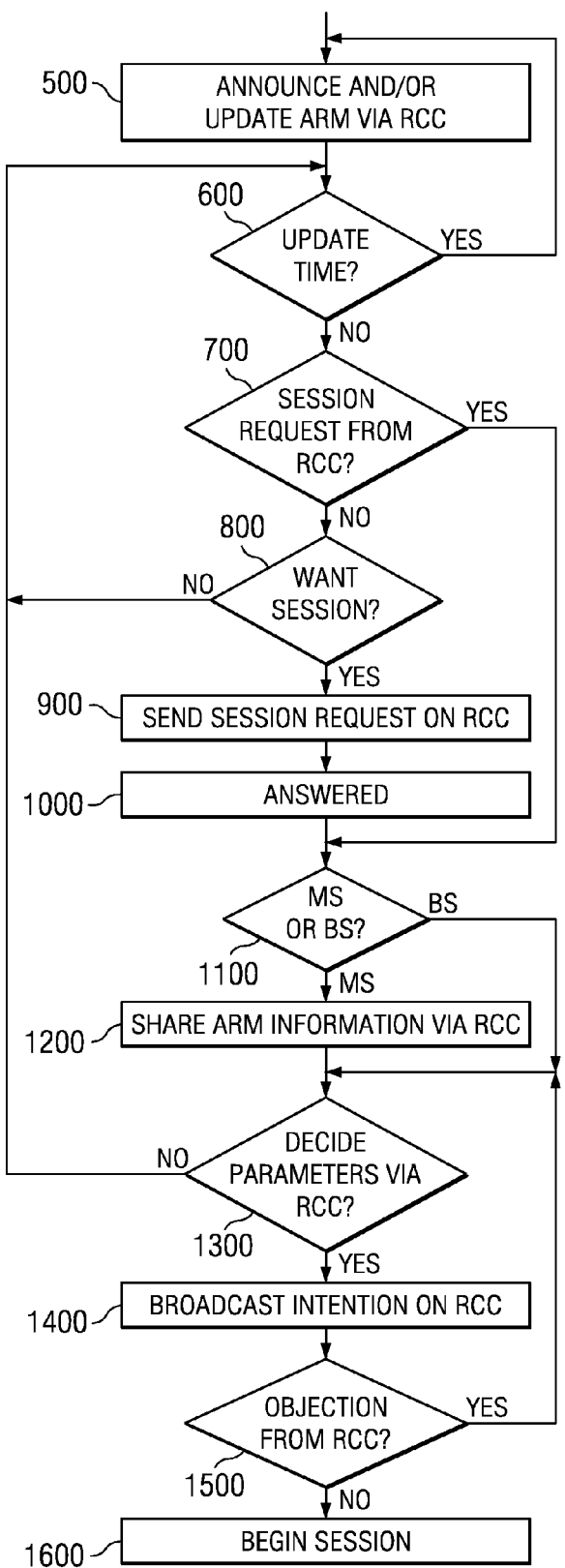
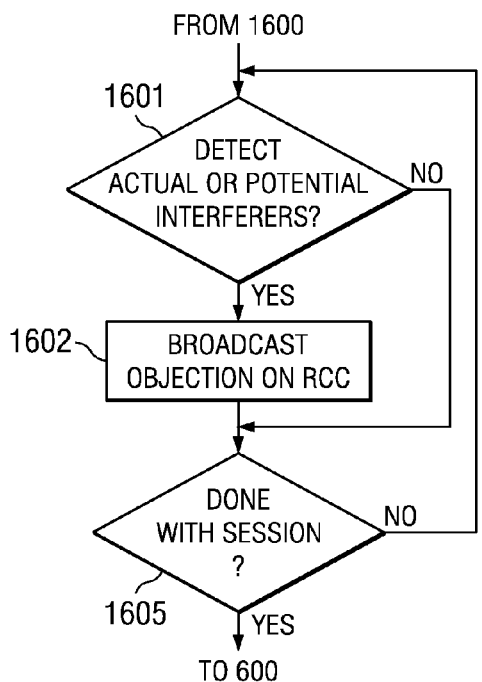
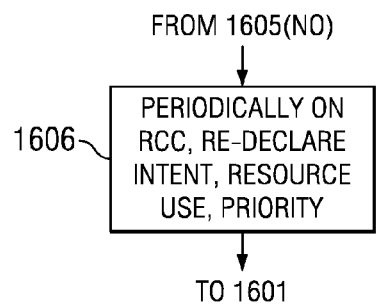

WIRELESSLY-LINKED, DISTRIBUTED RESOURCE CONTROL TO SUPPORT WIRELESS COMMUNICATION IN NON-EXCLUSIVE SPECTRUM

This application claims the priority under 35 U.S.C. 119 (e)(1) of the following copending U.S. Provisional Applications: 60/420,168 (TI-35503PS) filed on Oct. 22, 2002; and 60/431,561 (TI-35681PS) filed on Dec. 6, 2002, both of which are incorporated herein by reference.

FIELD OF INVENTION

The invention relates generally to wireless communication and, more particularly, to wireless communication in a non-exclusive spectrum.

BACKGROUND OF THE INVENTION

Conventional cellular wireless communication systems can typically be characterized as: voice-centric; operative in an exclusive frequency spectrum; capable of providing relatively long-range wireless communication links (e.g., 5 km); capable of providing relatively low latency; and utilizing frequency management techniques to provide a relatively high quality of service (QoS). Conventional wireless local area networks (WLAN) can be characterized as: data centric; operative in a non-exclusive frequency spectrum; having relatively high latency; having relatively short-range wireless communication links (e.g., 100 m); and having a relatively low QoS due to the inherent interruptions associated with use of interference mitigation techniques.

As communications applications become more and more sophisticated, there is an ever increasing demand for wireless communications at higher data rates. Although WLAN can typically provide higher data rates (e.g., 11 Mbps) than cellular systems (e.g., 10 Kbps), nevertheless cellular systems can outperform WLAN systems in terms of range, latency and QoS.

FIG. 1 graphically illustrates examples of spectrum utilization in exclusive-spectrum systems such as conventional cellular telephone systems. As shown in FIG. 1, various users, designated as 1-8 in FIG. 1, are assigned time slots for communication at a given frequency A. These time slots are generally adequate for conducting voice calls, and even for conducting some data communication sessions that do not require an appreciably higher data rate than a voice call. However, in order to support a data communication session at, e.g., four times (4×) the data rate of a typical voice call, four of the time slots of FIG. 1 would need to be assigned for the desired communication session. Thus, the user would utilize 4× the capacity of a typical voice user. Considering a hypothetical user who, at the 4× data rate, uses the same amount of calling time as another user who makes only voice calls, the 4× user will utilize 4× as much capacity as the voice call user, which would generally result in the 4× user bearing a cost that is 4× as large as the voice call user's cost. For example, if the voice call user's subscriber cost is $50.00 per month, then the 4× user's subscriber cost could be $200 per month.

Moreover, the 4× user's monopolization of capacity is disadvantageous to the cellular operator even if the 4× user is willing to pay the $200 per month for his desired service, because the cellular operator will no longer be able to support the same number of voice call users with the same QoS as would be the case if there were no 4× user.

Thus, although the range, latency and QoS characteristics of exclusive-spectrum systems such as cellular systems are superior to non-exclusive-spectrum systems such as WLAN, nevertheless exclusive-spectrum systems are not generally designed to support the type of high data rate calls supported by non-exclusive-spectrum systems.

It is desirable in view of the foregoing to provide an approach to wireless communication that can achieve conventionally unavailable combinations of characteristics such as data rate, latency, QoS and range.

BRIEF DESCRIPTION OF THE DRAWINGS

FIG. 5 illustrates exemplary operations which can be performed by the wireless communications system of FIG. 3.

FIGS. 6-9 illustrate further exemplary operations which can be performed by the wireless communications system of FIG. 3.

DETAILED DESCRIPTION

Figure 1:
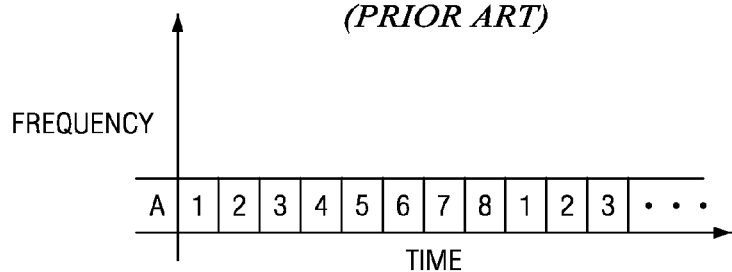
FIG. 1 graphically illustrates how costs generally scale with data rate in conventional cellular systems.
Figure 2:
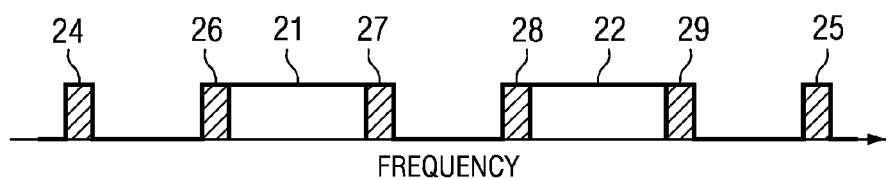
FIG. 2 graphically illustrates examples of non-exclusive frequency spectra that can be utilized for wireless communication according to exemplary embodiments of the invention.

Exemplary embodiments of the invention can provide for cellular-like performance in terms of latency, range and quality of service, but without the above-described type of data rate limitations normally associated with cellular systems. To accomplish this, the invention utilizes frequency channels outside of the licensed, exclusive spectrum utilized by cellular operators. This is illustrated generally in FIG. 2, wherein exemplary areas of the frequency spectrum that can be utilized by the present invention are shaded. Exclusive areas of the spectrum licensed to cellular operators are illustrated at 21 (FDD transmit frequencies) and 22 (FDD receive frequencies). As shown in FIG. 2, the invention can utilize, for example, non-exclusive, unlicensed portions of the frequency spectrum at 26-29, immediately adjacent the cellular transmit and receive areas 21 and 22, and can also utilize other portions of the frequency spectrum at 24 and 25. The frequency spectrum portions 24 and 25 can be portions of the frequency spectrum licensed to users whose utilization of the spectrum is highly concentrated within predetermined periods of time, leaving other periods of time where the frequency spectrum portions 24 and 25 are idle and therefore available to be shared.

Figure 3:
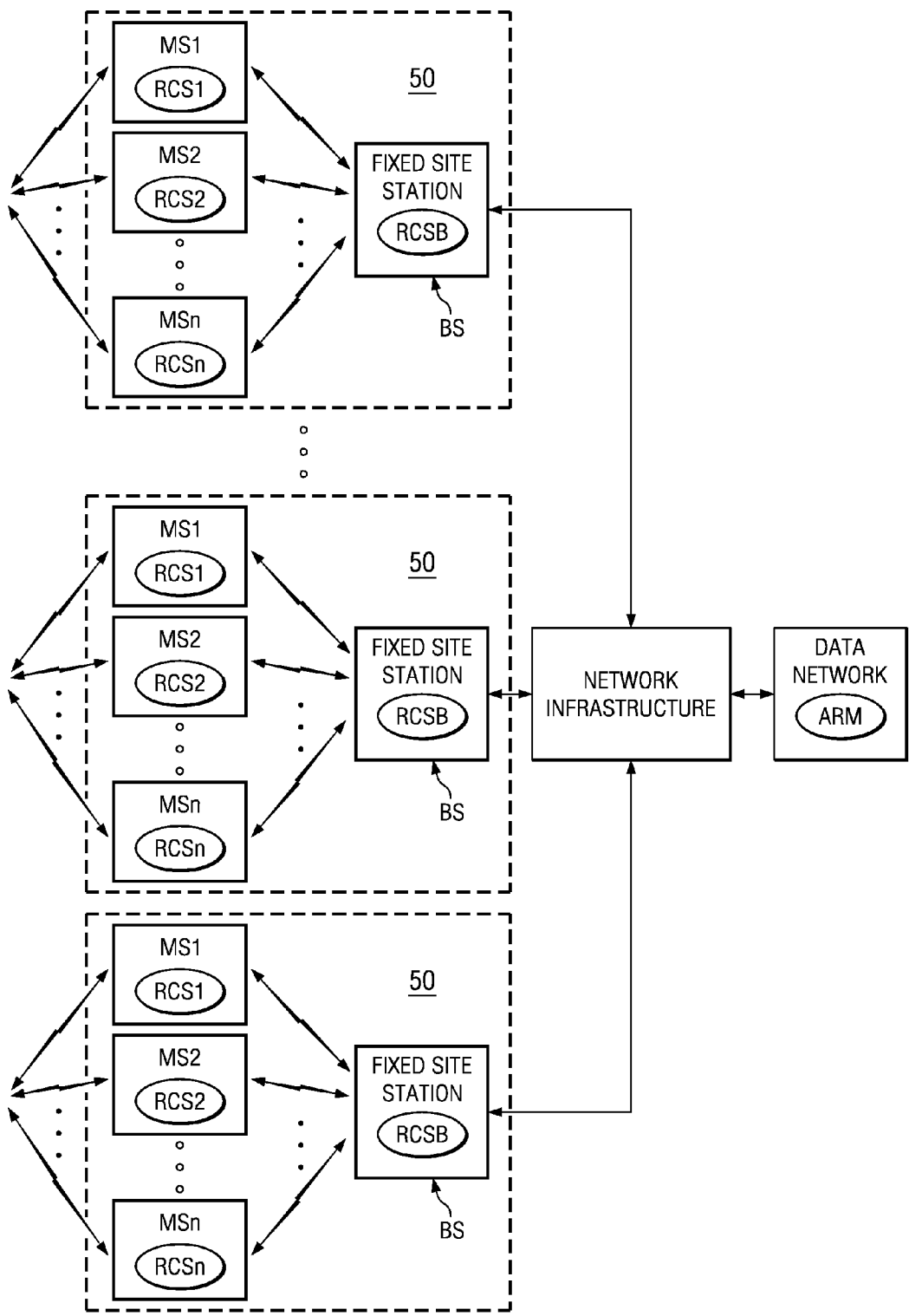
FIG. 3 diagrammatically illustrates exemplary embodiments of a wireless communications system according to the invention.

According to exemplary embodiments of the invention, allocation of resources within any of the shaded spectrum areas of FIG. 2 is controlled by a wirelessly-linked, distributed resource control system. FIG. 3 diagrammatically illustrates exemplary embodiments of a wireless communication system according to the invention, including a wirelessly-linked, distributed resource control system. In FIG. 3, a plurality of mobile wireless communication devices or mobile stations MS1, MS2, . . . MSn can communicate with one another and/or a fixed-site station (e.g., a cellular base station or other access point) BS via various wireless communication links as illustrated. The wireless communication links illustrated in FIG. 3 can be effectuated, for example, in any of the shaded frequency spectrum areas of FIG. 2. For example, the transmit and receive filters of a conventional mobile station such as a cellular telephone can be readily modified by workers in the art for operation in any of the four frequency spectrum areas 26-29 immediately adjacent the cellular spectrum in FIG. 2. Thus, all of the wireless communications illustrated in FIG. 3 could be effectuated in, for example, the spectrum portion 29 of FIG. 2.

The mobile stations MS1, MS2, . . . MSn respectively include resource control segments RCS1, RCS2, . . . RCSn. The base station BS of FIG. 3 includes a resource control segment RCSB. The resource control segments RCS1-RCSn can communicate with one another and with the resource control segment RCSB via wireless communication links as illustrated in FIG. 3. These wirelessly-linked resource control segments RCS1-RCSn and RCSB, or any subset thereof, constitute a wirelessly-linked, distributed resource control system. The distributed resource control system determines the allocation of resources within the portion of the frequency spectrum (e.g., one of the shaded portions of FIG. 2) that is being utilized by the wireless communication system of FIG. 3.

The fixed-site station BS can be, in some embodiments, a base station of a cellular operator, appropriately modified to include the resource control segment RCSB. Such a base station can also be readily modified by workers in the art to operate in any of the spectrum areas 26-29 of FIG. 2. The base station can be coupled in conventional fashion to its corresponding network infrastructure, for example a conventional cellular network infrastructure. The network infrastructure can be coupled in conventional fashion to a conventional data network including, for example, the Internet. Within the data network, an available resource map (ARM) can be provided, for example, in data storage memory on a conventional data base server, and can be accessed by authenticated users, in some embodiments, publicly from a suitable website on the Internet. The ARM is utilized to store information (described in detail hereinbelow) about the various mobile stations MS1-MSn, which information can be used to allocate resources in the process of establishing communication sessions among the mobile stations and/or between the mobile stations and the base station. Thus, some exemplary embodiments of the distributed resource control system include the ARM.

To facilitate exposition, the reference numeral 50 is used in FIG. 3 to designate the wirelessly-interconnected communication group including the mobile stations MS1-MSn and the fixed-site station BS. As shown in FIG. 3, other such communication groups 50 can also be provided according to exemplary embodiments of the invention.

The network infrastructure can, in some embodiments, be used according to the invention to implement a wired control channel (WCC) between fixed-site stations. In some embodiments, both the network infrastructure and the data network are used to implement a WCC according to the invention. In some embodiments, the WCC uses IP protocol or another suitable network communication protocol to effectuate information transfer. Examples of WCCs according to the invention are described hereinbelow.

Figure 4:
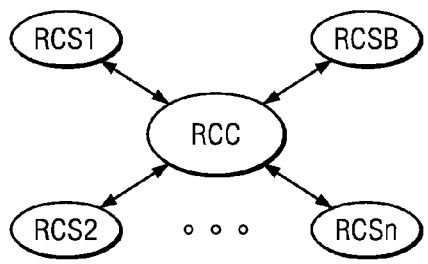
FIG. 4 conceptually illustrates the operation of distributed resource control systems implemented by the wireless communications system of FIG. 3.

FIG. 4 conceptually illustrates communications among the resource control segments illustrated in FIG. 3. As shown in FIG. 4, the resource control segments RCS2-RCSn and RCSB can communicate with one another via a resource control channel RCC. The resource control channel RCC is herein referred to as an ad-hoc control channel, due to the fact that this control channel permits all of the resource control segments or any subset thereof to cooperate among themselves to allocate resources for communication sessions desired by the various mobile stations. Exemplary uses of the ad-hoc resource control channel are described hereinafter relative to FIGS. 5 and 6.

FIG. 5 illustrates exemplary operations which can be performed by the wireless communication system of FIG. 3. At 500, a given mobile station can use the RCC to register its presence in the system and/or update the information in its corresponding entry in the ARM. The updated information is received by the fixed-site station, which then forwards the updated information to the ARM via conventionally available techniques and connectivity such as illustrated, for example, in FIG. 3. The ARM update operation at 500 can be repeated periodically, as illustrated at 600. At 700 and 1100, if a first mobile station receives from a second mobile station, via the RCC, a request for a communication session between the first and second mobile stations, then the first and second mobile stations will share ARM information at 1200 via the RCC. In some embodiments, the mobile station which received the request will simply include its ARM information in an acknowledgment message that it sends to the requesting mobile station on the RCC. Referring again to 700 and 1100, if a mobile station receives a session request from a fixed-site station, then the ARM information of the mobile station is already available to the fixed-site station, so the sharing of ARM information via the RCC at 1200 is not necessary.

At 1300, the communication stations that will be involved in the requested communication session use the RCC to reach agreement on various parameters of the communication session. If the requested communication session is a mobile-to-mobile session, then at least one of the mobile stations, in some embodiments the requesting mobile station, considers the ARM information of both mobile stations, and then suggests communication parameters to the other mobile station via the RCC. If the requested communication session is between a fixed-site station and a mobile station, then the fixed-site station, already having access to the mobile station's ARM information, can use the RCC at 1300 to instruct the mobile station as to the communication parameters. Examples of communication parameters (also referred to herein as communication resources or spectrum resources) include frequency channel, spreading code, modulation, time slot(s), transmit power, direction, etc.

If both communication stations agree on a set of communication session parameters at 1300, then one or both of the communication stations can use the RCC to broadcast on the RCC an intent to conduct a communication session using the communication resources agreed upon at 1300. At 1500, one or both of the communication stations can listen to the RCC to determine whether any other communication stations object to the communication session that was proposed at 1400. If no objection is received at 1500, then the communication stations can begin their wireless communication session at 1600, which wireless communication session can utilize the air interface in, for example, generally the same manner as in conventional cellular systems, except of course using different frequency bands.

In some embodiments, the communication stations involved in a communication session communicate in frequency-division duplex (FDD) fashion. For example, the areas of the frequency spectrum at 26 and 28 could be used by a first station for transmit and receive operations, respectively, and by a second station for receive and transmit operations, respectively. In some embodiments, the communication stations involved in a session communicate in a time-division duplex (TDD) fashion using a single frequency channel, and the timing parameters of the TDD can be agreed upon at 1300 in some embodiments. Use of single-channel TDD simplifies the design of the mobile stations for operation in spectrum areas such as 24 in FIG. 2.

In some embodiments, the communication stations can aggregate multiple channels to increase throughput. For example, a TDD communication session could be carried out on frequency channels in two or more of the bands at 24-29 in FIG. 2.

Referring again to FIG. 5, if an objection is received at 1500, then the communication stations attempt at 1300 to agree on another set of communication session parameters, including at least a different frequency channel. The operations at 1300, 1400 and 1500 can be repeated either until it is determined at 1500 that the conununication session can begin at 1600, or until it is determined at 1300 that the communication stations cannot agree on a set of communication session parameters that are acceptable to both communication stations and are also not objected to by other communication stations. If the communication stations cannot agree on communication session parameters at 1300, then operations can return to 600.

If a first mobile station desires a communication session with another mobile station at 800, then at 900, the first mobile station sends on the RCC a request for the desired communication session. If at 1000 and 1100 the request sent at 900 is answered by the desired mobile station, then the above-described operations at 1200-1600 can be performed. If a fixed-site station answers the request sent at 900 (e.g., because the desired mobile station is out of range), then the above-described operations at 1300-1600 can be performed.

With respect to the wireless communication sessions indicated at 1600, it should be noted that a communication session between two mobile stations constitutes both a wireless point-to-point communication session and an end-to-end communication session between peers, whereas a communication session between a mobile station and fixed-site station constitutes a wireless point-to-point communication session that is a component of an end-to-end communication session between two peer mobile stations. In the latter situation of a point-to-point mobile station/fixed-site station session, and referring again to FIG. 3, the ultimate end-to-end communication session between two mobile stations will also include one of (1) a further point-to-point wireless communication session between the fixed-site station and the other mobile station or (2) a link through a WCC in the network infrastructure from the fixed-site station to a further fixed-site station, and a further point-to-point wireless communication session between the further fixed-site station and the other mobile station. In situation (1) above, both mobile stations may be within range of the same fixed-site station, but the requested mobile station may be out of range of the requesting mobile station, so the fixed-site station, which is monitoring the RCC, picks up the request and sends it via the RCC to the requested mobile station (see 1100). So, the original request for a session with the requested mobile station is, in situation (1), ultimately implemented as a request by the requesting mobile station for a session with the fixed-site station, combined with a request by the fixed-site station for a session with the requested mobile station. In situation (2) above, the requesting mobile station and the requested mobile station are not within range of the same fixed-site station, so the fixed-site station within range of the requesting mobile station picks up the request from its monitoring of the RCC, and then proceeds to search the ARM to determine the location of the requested mobile station. Once the location of the requested mobile station is determined, then the fixed-site station uses a WCC to contact another fixed-site station which is within range of the requested mobile station. This further fixed-site station then uses the RCC to send a request to the requested mobile station (see 700 and 1100). In order to simplify matters for situation (2), the ARM can, in some embodiments, be partitioned into portions which respectively correspond to the various fixed-site stations (see also FIG. 3). In this fashion, when a given mobile station updates its ARM information to a within-range fixed-site station, the ARM information for that mobile station will be recorded in the ARM portion corresponding to the within-range fixed-site station. Each of the aforementioned portions of the ARM can also include an index of mobile station identifiers. This index identifies those mobile stations whose ARM information is stored in that portion of the ARM. In this fashion, any given fixed-site station that is searching for an out-of-range mobile station need only search the mobile station identifier indices of the ARM portions corresponding to the other fixed-site stations in order to determine which fixed-site station should be contacted to support the desired end-to-end communication session.

After a first fixed-site station has been notified (via a WCC) by a second fixed-site station that a requested mobile station appears in the ARM portion of the first fixed-site station, then the first fixed-site station can use a WCC through the network infrastructure and data network (FIG. 3) to access the ARM and retrieve the ARM information for the requested mobile station. Then, operations can proceed as described above relative to 1100 etc. in FIG. 5. In some embodiments, when a given fixed-site station receives an update of ARM information from a within-range mobile station, the fixed-site station not only updates its portion of the ARM, but also broadcasts to the other fixed-site stations, via a WCC through the network infrastructure, a message indicating that any information for that mobile station can be deleted from the portions of the ARM corresponding to the other fixed-site stations.

Figure 11:
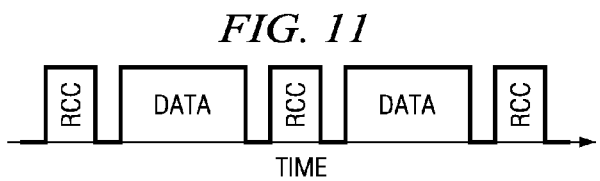
FIG. 11 illustrates exemplary timing of communication operations that can be performed by a mobile station of FIG. 3.

FIG. 6 illustrates exemplary operations which can be performed according to the invention by communication stations that are participating in any of the aforementioned wireless point-to-point communication sessions. Once the communication session has begun as illustrated at 1600 (see also FIG. 5), one or both of the communication stations participating in the communication session can detect at 1601 actual or potential interfering communication sessions. An actual interfering communication session could be detected, for example, as a noticeable degradation of the communication stations' ongoing communication session. A potentially interfering communication session could be detected by one or both communication stations monitoring the RCC and detecting that another communication station has broadcast its intention to conduct a communication session which will interfere with the ongoing communication session between the two communicating stations, for example an intention to conduct a communication session on the same frequency channel as, and too close to, the ongoing communication session. If an actual or potential interferer is detected at 1601, the detecting communication station(s) can, at 1602, broadcast on the RCC an objection to the intention to conduct the interfering session. As long as the communication session continues (see 1605), the operations at 1601 and 1602 can continue. This is shown in FIG. 11, where RCC accesses are timewise interleaved with the data flow of the communication session.

As mentioned above, each mobile station can provide its own ARM information. This ARM information can include an identifier for the mobile station, and information which indicates the position/location of the mobile station and/or the uncertainty of the position/location, together with an indication as to the degree of accuracy of the indication of position/location or uncertainty. Some embodiments of the mobile stations include conventional Global Positioning System (GPS) capabilities in order to permit the mobile stations to determine their position/location information. The ARM information can also include information about the current transmit power levels and directionalities on the various frequency channels available to the mobile station. Using conventional techniques, the mobile station can monitor power levels and directionality for each available frequency channel. Some mobile station embodiments can also use conventional techniques to monitor and determine which time slots, spreading codes, etc. are being used on the various frequency channels. Other exemplary ARM information can include the capabilities of the mobile station, whether the mobile station is in a service area of a base station, etc.

Figure 9:
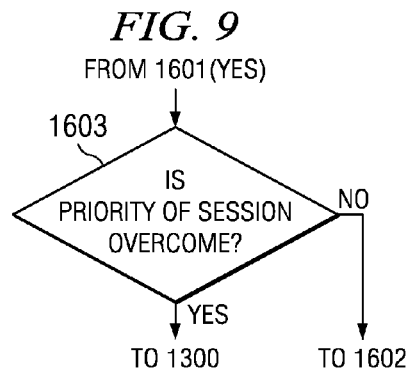

The ARM information can also include priority information for the mobile station. For example, in some embodiments, the mobile station can maintain a record of the total radiated energy (TRE) that it has dissipated at its antenna over a predetermined time period. The TRE can be a useful measure of system utilization because it tracks not only how long the mobile station has been in an active session, but also how heavily the mobile station has utilized communication system resources. Longer range sessions, and sessions involving high data rates, normally require higher power levels, so the TRE can provide a measure of how the mobile station has utilized range and data rate capabilities, and for how long. This information is effectively a measure of the occupation of shared resources such as frequency and time. The priority information in the ARM can be used to determine communication session priorities, as described further hereinbelow. The sum of the TREs of the mobile stations involved in a communication session can be used as a priority rating for the session. Referring to FIGS. 6 and 9, in some embodiments, if a proposed interfering session detected at 1601 has a higher priority than the current session, then the current session is dropped in favor of the higher priority session, as shown at 1603 in FIG. 9. Also, in high-traffic regions, an attending fixed-site station may broadcast on RCC the minimum priority that will be accepted in its immediate region, thereby reducing the number of inquiries on RCC. Some embodiments can limit the maximum data rate in highly congested areas.

The ARM information for a given mobile station can also include, in some embodiments, the operational capabilities of the mobile station, for example the type(s) of modulation supported by the mobile station, the maximum transmit power of the mobile station, and the operational frequency range of the mobile station. Regarding the type(s) of modulation, the system is considerably simplified in some embodiments by limiting the type(s) of modulation allowed within the portion of the spectrum that is being utilized (e.g., 26 in FIG. 2). Without such limitation, a diverse mix of operating bandwidths and modulations in a defined frequency channel could require the mobile stations to conduct an extensive search across spectrum, bandwidth and modulation to determine possible interferers in their vicinity. Some embodiments program the mobile stations periodically with a set of forbidden frequencies (e.g., passive, weak channels, channels with complex modulation).

Figure 8:
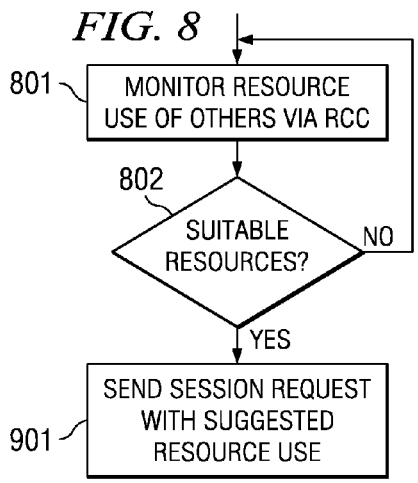

Referring again to FIG. 5, in some embodiments, the operation shown at 1400 can be repeated periodically during the duration of the communication session at 1600. This is shown in FIG. 7, wherein at 1606 one or both communication stations involved in the communication session can, as frequently as desired, declare on the RCC an intent to continue the communication session (in other words, re-declare the original intent from 1400). This redeclaration of intent can identify the communication resources used by the session, for example, those that were agreed on at 1300. In such embodiments, a mobile station can monitor re-declarations on the RCC long enough to learn which users are using what resources, and therefore, how all pertinent communication resources are presently utilized. This is shown in FIG. 8. RCC is monitored at 801 to determine the resource usage of other users, and if suitable communication resources are identified at 802, then the mobile station can send on RCC a request for a desired communication session, including suggested communication resources for the desired session, as shown at 901. In this instance, because the requesting mobile station has adequate system information to go ahead and suggest resources, the ARM information sharing operation at 1200 in FIG. 5 would not necessarily be needed.

The RCC can be defined, in some embodiments, for operation on a predetermined frequency (e.g. in one of 26-29 of FIG. 2) for all communications within a suitably large geographical area, for example nationwide in the United States. This large geographic region can then be divided into a grid that is sized at some fraction of the range of the mobile stations and fixed-site stations in the system. As one example, the grid spacing can be one half of the minimum expected range of a mobile station to fixed-site station link.

The mobile stations and base stations/access points would transmit information on the RCC using, for example, a CDMA code that corresponds to its geographic position. In some embodiments, the code for a specific section of the grid could be determined as a function of the latitude and longitude of that grid section. Given that each mobile station knows its precise location (e.g. from GPS), the mobile station can then determine the code that it should use for transmitting information on the predetermined frequency of the RCC. In some embodiments, a look-up table or suitable algorithm can be used to determine the code based on location.

Given the aforementioned exemplary grid size of one half of the minimum expected range, mobile stations and fixed-site stations in neighboring grid sections would be possible interferers. However, the mobile stations and fixed-site stations would also be able to determine the codes for the neighboring grid sections, and therefore could easily receive information from mobile stations and fixed-site stations in neighboring grid sections as well. The spreading codes could be re-used across the grid in generally the same fashion as they are conventionally re-used over a number of cellular system cells, so that re-use of codes in far away grids would not be a problem. As an example, in a rectilinear grid, most of the grid sections would be surrounded by eight adjacent sections, so the re-use factor is nine. Some embodiments can create "virtual" cells of various shapes using GPS information and predefined areas.

In some embodiments, conventionally available timing information, for example GPS timing signals, can be used to provide a time reference for the RCC (and for the communication sessions themselves). The RCC can be constructed from frames that are synchronized to the available timing information. A plurality of frames, each having a length of, for example, 2 seconds or 5 seconds, could be established with reference to the beginning of each GPS minute. Thus, at the beginning of a GPS minute, a new 2 or 5 second frame would begin, followed by new frames at each 2 or 5 second interval within the GPS minute. Also, users that do not have access to the timing signal could learn the timing of the RCC by simply monitoring other users on the RCC, because the other users, which do have access to the timing signal, would begin each frame at the appropriate time.

Each RCC frame can be divided into predetermined time slots. Within each frame, time slots can be reserved for the following exemplary communications (and others): for base stations/access points to notify mobile stations of their desire to establish a communication session; for mobile stations to notify base stations/access points and other mobile stations of their desire to establish a communication session; for base stations/access points to broadcast intentions for new communication sessions; for mobile stations to broadcast intentions for new communication sessions; for base stations to object to proposed new communication sessions; for mobile stations to object to proposed new communication sessions; for mobile stations engaged in communication sessions with other mobile stations to declare their intentions to continue their sessions and update their system resource allocation; for mobile stations to register with base stations and/or other mobile stations; and for broadcasting the needs and priority information of mobile stations that could not receive service due to system resource limitations. In some embodiments, the time slots are, for example, 250 ms long.

With the above-described exemplary RCC structure including frames and time slots, a mobile station need only access the RCC at times of interest to the mobile station. For example, an idle mobile station would only need to monitor the RCC during the time slots in which a base station or other mobile station might request a session with the idle mobile station.

With the exemplary frame and time slot definitions given above, some embodiments utilize a conventional CSMA/CA approach (similar to the network interface used for IEEE 802.11) to determine when information can be transmitted on the RCC. In CSMA/CA, each user listens to the channel (here the RCC), waits for a period of no activity, and then transmits. If the transmission collides with another user's transmission, then each colliding user waits for an amount of time based on a random number, and begins transmitting after the amount of time has elapsed. In some embodiments, the amount of time waited could be based on the priority code of the individual user (lower value priority code waits longer), thereby ensuring that high priority users are given priority access to the RCC with respect to lower priority users. In some embodiments, a user that is unable to access the RCC during a desired time slot within a given frame can try again during the same time slot of the next frame.

Any user can potentially transmit on the RCC at any time, so some communications would be clearly received, while others would be unintelligible. Therefore, an etiquette for controlling access to the RCC can be provided. For example, if a transmit collision occurs because two users simultaneously declare an intention to use certain spectrum resources (whether the same spectrum resources or not), the users would most likely receive a NAK. A NAK is a "not acknowledge" indication that the request has been denied or objected to. Users would normally send a NAK on RCC when they hear a new user trying to establish a new session that would collide with their present usage. Users would also send a NAK when they receive an input at a sufficient signal strength that it should have been understood, but was not understood because it was jammed by another user transmitting on the RCC at the same time. Since the aforementioned colliding users don't know about each other, each would believe that the NAK was either an indication that the proposed spectrum resources are in use, or that their spectrum request proposal has experienced a collision. In either instance, each new user wants high confidence that the message proposing use of spectrum resources has been received. One exemplary rule of etiquette for handling collisions would be for a user to restate its intention to use the spectrum resources in the next available time slot (actually a sub-slot within the "broadcast intention" time slot mentioned above) if the first digit of the user's identification number is even, and to restate its intention to use the spectrum resources in the second-next available time slot (sub-slot) if the first digit of the user's identification number is odd. If a second collision occurs using this procedure, a further etiquette procedure could be implemented, for example, each user selecting a time slot (sub-slot) for retransmission based on the size of its TRE.

Some exemplary embodiments support a frame structure that is not synchronized by an externally available timing signal, but rather where the timing is established by a first user of the system. Assuming that the frame and time slot structure of the RCC is known, if a first user begins to monitor the RCC and finds that there are no other users present, at such time when that first user is ready to establish a communication session (at which time there would need to be at least a second user within the first user's range), the first user could begin transmitting the spectrum usage of the communication session on the RCC. Because this transmission of spectrum usage is periodically defined within the framing and time slot structure of the RCC, any additional users who eventually monitor the RCC could determine the timing of the RCC from the first user's transmissions. In this manner, the RCC timing could be established from a "cold" start (with no users present), thereafter serve a growing number of users, and then eventually shut down, all based on the internal clock of the first user, and without the benefit of any externally available timing signal.

In the system of FIG. 3, there are no hard cell boundaries, so spectrum can be used and re-used without regard to where the users are relative to physical boundaries. Of course, if the fixed-site station is a cellular base station, then the network operator might prefer to use the spectrum (e.g., at 26, 27, 28, 29) in a "cellular" manner. However, the mobile station users need only utilize the spectrum and power levels required to complete their communication sessions. When a first mobile station uses the RCC to transmit a request for a communication session with a second mobile station that is within range of the first mobile station, the first and second mobile stations can share their ARM information via the RCC (see 1200 in FIG. 5) to determine what spectrum is available. Based, for example, on their respective locations and the frequency channel conditions that they have observed in their respective vicinities, the first and second mobile stations can calculate the minimum transmit power levels required for a successful communication session, and can then begin their session. The local fixed-site station becomes aware of the peer-to-peer session between the two mobile stations when they report the communication session on the RCC, so these two mobile stations now share with the fixed-site station the spectrum resources that they are utilizing for their peer-to-peer session in their local area. This does not mean, however, that other users cannot also access the same spectrum resources in other areas, even areas that are within range of the fixed-site station. That is, for example, one or more other sessions between mobile stations within range of the same fixed-site station, or between the same fixed-site station and a mobile station, could occur using the same spectrum resources, so long as the RCC is used, for example in the exemplary fashion described above, to ensure that these simultaneous sessions do not interfere with one another.

In some exemplary embodiments, an intention to utilize spectrum resources would be transmitted on the RCC at a slightly higher power level than is intended to be used for the actual communication session. This would increase the likelihood that the intention broadcast would be heard by users with which the proposed communication session would interfere, while also avoiding the possibility of needlessly reaching far away users. Also, if more than one of the communication stations associated with a proposed session broadcasts the intention to use spectrum resources for the session, then an aspect of diversity is provided. In this manner, if a user that is already using the desired spectrum resources cannot receive the intention broadcast from one of the users proposing the new session, the intention broadcast from the other user might nevertheless be clearly received.

The communication stations can, in some embodiments, implement conventional error correction coding, scrambling, interleaving and/or other interference avoidance schemes with respect to their transmissions and receptions on the RCC, in order to increase the likelihood that information carried on the RCC may still be communicated effectively even, for example, during interference from far away users.

Figure 12:
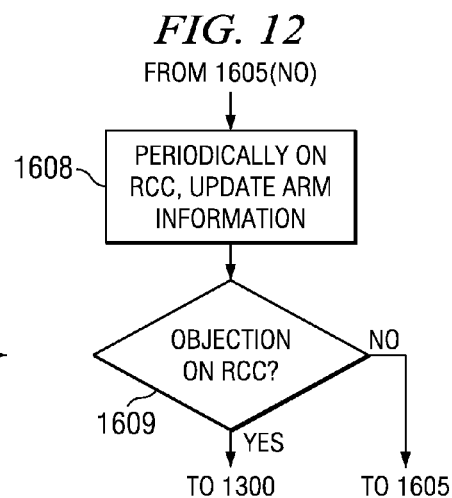
FIG. 12 illustrates further exemplary operations which can be performed by the wireless communications system of FIG. 3.

Some embodiments can support mobility during mobile station-to-mobile station sessions. This mobility can be supported, for example, by having the mobile stations periodically update their resource use information (as shown at 1608 in FIG. 12). For example, a once-per-minute update of a mobile station's positional information can provide position accuracy of 200 meters when the mobile station is traveling at 10 kilometers per hour. If the updated position and channel information indicates an interference threat to another user (i.e., expected interference), the other user can then issue an objection on RCC, as indicated at 1609 of FIG. 12 (see also 1601 and 1602 of FIG. 6 where the other user detects and objects to interference). Such an objection could also be issued, on behalf of other users, by a local fixed-site station that is monitoring the ARM updates performed at 1608. If an objection is detected at 1609, operations can proceed to 1300 in FIG. 5 to identify other resources.

Mobility at higher speeds can be supported in some embodiments. Once a mobile station-to-mobile station session has been established, the mobile stations communicate with each other using the communication resources that they have agreed upon. Information regarding power levels, channel quality or other information needed for session control can be communicated over the actual system resources allocated for the session, rather than the RCC, so the operation at 1608 of FIG. 12 would not be necessary. This permits the mobile stations to maintain an acceptable communication session so long as there are no interfering sessions present. In some embodiments, the mobile stations involved in the moving session can, from time to time, update their resource use information on RCC. The mobile stations involved in the moving session (i.e., moving together at low relative velocity) can monitor the RCC to detect any urgent requests to drop their session (see 1609 in FIG. 12). If a session involving one or more moving mobile stations begins to interfere with another session, the moving session can drop immediately if requested to do so by any user that detects objectionable interference from the moving session (see also 1601 and 1602 in FIG. 6). Such embodiments can be useful, for example, in remote areas where interference is unlikely and lack of updates to the RCC is not a significant concern. In other embodiments, the moving session is dropped only if an objecting user has higher priority than one or both of the moving session users.

Some users will need the capability of establishing both short and long-distance sessions. In some embodiments, the spectrum can be utilized so that long-distance channels are preserved for potential long-distance (e.g., 5 km) users. Short distance (e.g. 100 m) users can try to operate as much as possible in a predetermined area of spectrum. Short distance users can be required, for example, to use spectrum in one region of the total available spectrum until that region is fully utilized, and only use spectrum from other regions of the total available spectrum in a predetermined manner and only when needed. The long distance users could then use spectrum from another region, and only use the short distance spectrum when essential. For example, short distance users can cluster and make maximum use of higher frequencies (e.g., 25 in FIG. 2) in the available spectrum, and long distance users can cluster and make maximum usage of lower frequencies (e.g., 24 in FIG. 2) in the available spectrum. This reduces the search time for an open frequency, and orders the assignment of frequencies in a manner which allows a mix of short and long distance users to exist in a random pattern. The distance between users of a desired session can be determined from location data in the ARM information, and the frequency for the session can then be selected from the appropriate part of the spectrum (see 1200 and 1300 of FIG. 5).

In some embodiments, the mobile station is capable of conducting a WLAN session in the unlicensed ISM band and is also capable of conducting a cellular session in the paid cellular band. So, for example, the mobile station might first attempt to establish a WLAN session in the ISM band and, if that fails, it might next try to establish one of the above-described sessions in, for example, one of the spectrum areas illustrated at 26-29 in FIG. 2 and, if that fails, it might ultimately try to make a call in the paid cellular band.

Figure 10:
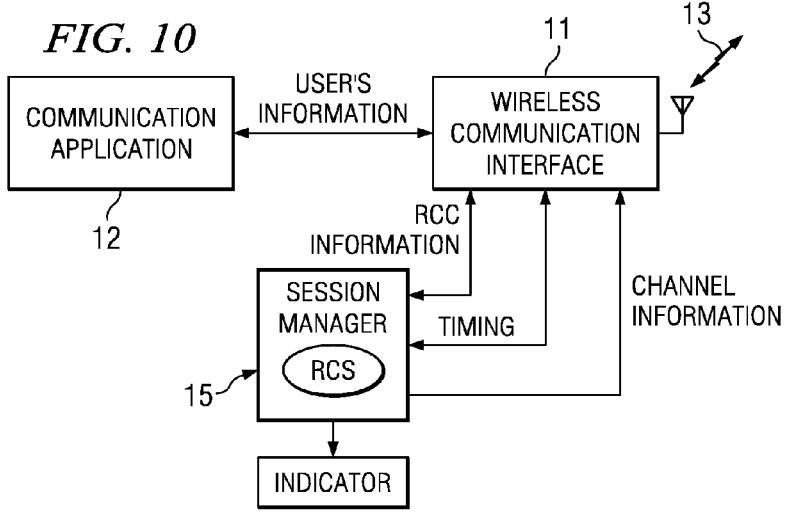
FIG. 10 diagrammatically illustrates pertinent portions of exemplary embodiments of a mobile station of FIG. 3.

FIG. 10 diagrammatically illustrates pertinent portions of exemplary embodiments of a mobile station of FIG. 3. A wireless communication interface 11 can use generally conventional techniques to interface a user's communications application 12 (e.g., high speed video, audio, voice, email, short messaging, etc.) to the air interface 13. As mentioned above, in some embodiments, the wireless communication interface 11 can be similar to that of a conventional cellular device, but with its transmit and receive filters slightly modified to permit access to desired spectrum such as the shaded areas 26-29 of FIG. 2. A session manager 15 coupled to the wireless interface 11 can effectuate exemplary operations illustrated in FIGS. 5-9, 11 and 12. The session manager 15 includes the mobile station's resource control segment RCS, which participates in the resource control system via information transmitted and received on the RCC. The session manager 15 can be implemented, for example, by suitably modifying software, hardware or both, in a conventional wireless mobile communication station, for example a cellular phone. After resources for a given session are allocated, or when RCC access is needed, the session manager provides appropriate channel information and timing information to the wireless communication interface 11. Based on this channel and timing information, the wireless communication interface can operate in generally conventional fashion to effectuate communications on the RCC and on the various channels available for communications sessions.

It will be evident to workers in the art that the air interface in exemplary embodiments can be provided as, for example, a UMTS interface, an HSDPA interface or an OFDM interface. Exemplary embodiments of the invention can utilize such exemplary multiple access techniques as TDMA, CDMA, FDMA, and combinations of CDMA, TDMA and FDMA.

Referring again to FIG. 2 and FIG. 3, the fixed-site stations' capability of accessing the data network via the network infrastructure permits the license holder for spectrum areas such as shown at 24 and 25 in FIG. 2 to offer access to his spectrum for a fee. In particular, in some embodiments, a mobile station user who wishes to access an area of licensed spectrum such as illustrated at 24 and 25 in FIG. 2 can use the RCC to make a request to use that spectrum. The local fixed-site station receives the request and forwards it through the network infrastructure to the data network. The license holder receives the request via the data network and can grant access to the spectrum in exchange for a promise to pay, or in view of an existing line of credit that the user may have with the license holder. In other exemplary embodiments, an on-line auction can be conducted so that users of various mobile stations can use the fixed-site stations, the network infrastructure and the data network to bid on the license holder's spectrum.

In some embodiments, each fixed-site station can monitor all RCC activity within its range in order to build a resource utilization map for its local service area. The fixed-site stations can, from time-to-time, exchange their respective local resource utilization maps with one another via WCC. In some embodiments, a mobile station can establish a special session with the fixed-site station for the purpose of downloading the fixed-site station's local resource utilization map to the mobile station. In other embodiments, the fixed-site station can broadcast its local resource utilization map on RCC in order to effectuate a download of the local resource utilization map to all mobile stations within range of the fixed-site station.

By maintaining their local resource utilization maps, the fixed-site stations are able to support the mobile stations (albeit at a reduced level of functionality) even if the link to the ARM (see also FIG. 3) is lost for any reason.

In some embodiments, the fixed-site stations can support moving communication sessions such as described above by anticipating handoff needs in advance. For example, a first fixed-site station can monitor RCC in order to learn the spectrum needs for anticipated handoffs, and can then use WCC to reserve appropriate spectrum with a second fixed-site station so that the mobile stations involved in the moving session will have a much higher likelihood of uninterrupted service as they leave the service area of the first fixed-site station and enter the service area of the second fixed-site station. Using WCC to coordinate handoff information in this fashion can permit the mobile stations of a moving session to enter a service area of a new fixed-site station without using RCC to set up a new session in the service area of the new fixed-site station.

As described above, the RCS of each mobile station illustrated in FIG. 3 can build up its own ARM information, for example, by monitoring RCC or by directly monitoring the various channels which might possibly be available for a communication session. Having thus accumulated its own ARM information, the mobile station can, in some embodiments, provide the user with an indication of the likelihood that a communication session could be successfully established and/or executed. For example, a visual indicator such as a simple LED could signify whether or not the probability of successfully establishing a communication session within the next few minutes is higher than a predetermined threshold. In other embodiments, the RCS of the mobile station can maintain samples of ARM information accumulated over time, and can use this accumulated information to present to the user a graphical indication of the likelihood of successful establishment and/or execution of a communication session as a function of the time of day. FIG. 10 illustrates an indicator that can operate as described above.

Although exemplary embodiments of the invention are described above in detail, this does not limit the scope of the invention, which can be practiced in a variety of embodiments.

What is claimed is:

1. A system for controlling allocation of wireless communication resources, comprising:

a first resource control segment, and a first wireless communication interface connected to said first resource control segment;

a second resource control segment, and a second wireless communication interface connected to said second resource control segment, said second resource control segment and said second wireless communication interface provided together in a wireless mobile communication apparatus;

said first and second wireless communication interfaces cooperable to couple said first and second resource control segments for wireless communication; and said first and second resource control segments cooperable for making a resource allocation decision with respect to a wireless communication session involving the wireless mobile communication apparatus, said resource allocation decision including a determination to use, or not to use, frequency spectrum other than frequency spectrum utilized by cellular operators, for additional communication between said first and second wireless communication interfaces.

2. The system of claim 1, wherein said resource control segments are cooperable for selecting wireless communication resources for the communication session.

3. The system of claim 1, wherein said resource control segments are cooperable for deciding that a further wireless communication session will be discontinued because the further wireless communication session uses resources already allocated to the first-mentioned wireless communication session.

4. The system of claim 3, wherein said first resource control segment is provided in a further wireless mobile communication apparatus involved in the further communication session.

5. The system of claim 1, wherein said resource control segments are cooperable for deciding that resources allocated for the wireless communication session will be released for use in a further wireless communication session that does not involve the wireless mobile communication apparatus.

6. The system of claim 5, wherein said resource control segments are cooperable for deciding that the further communication session has a higher priority than the first-mentioned communication session to use communication resources currently allocated to the first-mentioned communication session.

7. The system of claim 5, wherein said first resource control segment is provided in a further wireless mobile communication apparatus involved in the further communication session.

8. The system of claim 1, wherein said first resource control segment is provided in a further wireless communication apparatus involved in the wireless communication session.

9. The system of claim 8, wherein the further wireless communication apparatus is a mobile wireless communication apparatus.

10. The system of claim 1, wherein said first and second resource control segments are cooperable for communicating among one another information indicative of a likelihood of successful execution of the communication session.

11. The system of claim 10, wherein said first resource control segment is provided in a further wireless communication apparatus involved in the communication session.

12. The system of claim 11, wherein the further wireless communication apparatus is a mobile wireless communication apparatus.

13. The system of claim 10, wherein said information includes one of information indicative of a location of the wireless mobile communication apparatus, information indicative of wireless communication channel conditions at the wireless mobile communication apparatus, information indicative of wireless communication resource use in a previous wireless communication session involving the wireless mobile communication apparatus, and information indicative of operational capabilities of the wireless mobile communication apparatus.

14. The system of claim 10, including an information storage apparatus coupled to said first resource control segment, said information storage apparatus for storing said information.

15. The system of claim 14, wherein said first and second wireless communication interfaces are cooperable for wireless transmission of said information from said second resource control segment to said first resource control segment.

16. The system of claim 14, wherein said information storage apparatus is provided in a data network.

17. The system of claim 16, wherein said data network includes the internet.

18. The system of claim 1, wherein said first and second resource control segments are cooperable for deciding whether communication resources will be allocated for the communication session.

19. The system of claim 1, wherein said first resource control segment is provided in a further wireless mobile communication apparatus.

20. The system of claim 1, wherein said resource control segments are cooperable for determining a distance over which the communication session will be conducted, and are further cooperable for selecting a frequency channel for the communication session based on said distance.

21. The system of claim 20, wherein said resource control segments are cooperable to select for the communication session one of a frequency channel at a relatively lower frequency if the communication session will be conducted over a relatively longer distance and a frequency channel at a relatively higher frequency if the communication session will be conducted over a relatively shorter distance.

22. The system of claim 1, wherein said frequency spectrum other than frequency spectrum utilized by cellular operators implements frequency channels adjacent the frequency channels utilized by cellular operators.

23. The system of claim 1, wherein when said resource allocation decision is to use frequency channels other than frequency channels utilized by cellular operators, frequency channels in the ISM band are selected if available and, if not available, frequency channels having frequencies adjacent said frequencies of said frequency channels utilized by said cellular operators are selected.

24. The system of claim 1, wherein said frequency spectrum other than frequency spectrum utilized by cellular operators is in the ISM band.

25. The system of claim 1, wherein the frequency spectrum utilized by cellular operators are those frequency channels used by fixed-site stations within communication range of said second wireless communication interface.

26. A system for controlling allocation of wireless communication resources, comprising:
a first resource control segment, and a first wireless communication interface connected to said first resource control segment;
a second resource control segment, and a second wireless communication interface connected to said second resource control segment, said second resource control segment and said second wireless communication interface provided together in a wireless mobile communication apparatus;
said first and second wireless communication interfaces cooperable to couple said first and second resource control segments for wireless communication; and
said first and second resource control segments each sharing available resource map (ARM) information with the other and thereafter arriving at an agreed upon resource allocation decision with respect to a wireless communication session involving the wireless mobile communication apparatus, said resource allocation decision includes a determination to use, or not to use, frequency channels other than those utilized by cellular operators, for additional communication between said first and second wireless communication interfaces.

27. The system of claim 26, wherein said resource allocation decision concerns transmit and receive frequencies used by said first and second wireless communication interfaces to communicate with each other.

28. The system of claim 26, wherein said resource allocation decision includes a determination to use, or not to use, frequency channels other than those utilized by cellular operators, for additional communication between said first and second wireless communication interfaces.

29. The system of claim 26, wherein said first resource control segment and said first wireless communication interface are provided together in another wireless mobile communication apparatus.

30. A system for controlling allocation of wireless communication resources, comprising:
a first resource control segment having access to information in a first resource map, and a first wireless communication interface connected to said first resource control segment;
a second resource control segment having access to information in a second resource map, and a second wireless communication interface connected to said second resource control segment, said second resource control segment and said second wireless communication interface provided together in a wireless mobile communication apparatus;
said first and second wireless communication interfaces cooperable to couple said first and second resource control segments for wireless communication; and
said first and second resource control segments sharing information available from said first and second resource maps and thereafter arriving at an agreed upon resource allocation decision with respect to a wireless communication session involving the wireless mobile communication apparatus, said resource allocation decision includes a determination to use, or not to use, frequency channels other than those utilized by cellular operators, for additional communication between said first and second wireless communication interfaces.

31. A system for controlling allocation of wireless communication resources, comprising:

a first resource control segment, and a first wireless communication interface connected to said first resource control segment;

a second resource control segment, and a second wireless communication interface connected to said second resource control segment, said second resource control segment and said second wireless communication interface provided together in a wireless mobile communication apparatus;

said first and second wireless communication interfaces cooperable to couple said first and second resource control segments for wireless communication; and said first and second resource control segments each sharing with the other available transmit and receive frequencies and thereafter agreeing upon respective transmit and receive frequencies with respect to a wireless communication session involving the wireless mobile communication apparatus, said agreement includes a determination to use, or not to use, frequency channels other than those utilized by cellular operators, for additional communication between said first and second wireless communication interfaces.

* * * * *